US012137673B2

(12) United States Patent
Nguyen et al.

(10) Patent No.: US 12,137,673 B2
(45) Date of Patent: Nov. 12, 2024

(54) MULTI-FUNCTION DEVICE USED FOR INTENSIVE SHRIMP FARMING AND INTENSIVE SHRIMP FARMING SYSTEM USING THIS DEVICE

(71) Applicant: RYNAN TECHNOLOGIES—VIETNAM JOINT STOCK COMPANY, Tra Vinh (VN)

(72) Inventors: Thanh My Nguyen, Tra Vinh (VN); Quoc Toan Tran, Duyen Hai (VN); Vu Khanh Vo, Tra Cu (VN); Quoc Viet Vo, Tra Vinh (VN); Le Nhut Hao Huynh, Giong Rieng (VN); Minh Chau Bui, Thoi Binh (VN); Quoc Cuong Hong, Tra Vinh (VN); Huynh Ngoc Duy To, Tra Vinh (VN); Thi Tu Trinh Nguyen, Cang Long (VN); Thai Binh Pham, Duyen Hai (VN); Bao Dang Pham, Can Tho (VN)

(73) Assignee: RYNAN TECHNOLOGIES—VIETNAM JOINT STOCK COMPANY, Tra Vinh (VN)

( * ) Notice: Subject to any disclaimer, the term of this patent is extended or adjusted under 35 U.S.C. 154(b) by 0 days.

(21) Appl. No.: 17/793,995

(22) PCT Filed: Apr. 15, 2022

(86) PCT No.: PCT/IB2022/053561
§ 371 (c)(1),
(2) Date: Jul. 20, 2022

(87) PCT Pub. No.: WO2023/062438
PCT Pub. Date: Apr. 20, 2023

(65) Prior Publication Data
US 2024/0180127 A1 Jun. 6, 2024

(30) Foreign Application Priority Data

Oct. 14, 2021 (VN) .............................. 1-2021-06470

(51) Int. Cl.
*A01K 61/59* (2017.01)
*A01K 61/80* (2017.01)
*A01K 63/04* (2006.01)

(52) U.S. Cl.
CPC .............. *A01K 61/59* (2017.01); *A01K 61/80* (2017.01); *A01K 63/042* (2013.01)

(58) Field of Classification Search
CPC ...... A01K 63/042; A01K 61/80; A01K 61/85; A01K 61/59; B01F 23/23761;
(Continued)

(56) References Cited

U.S. PATENT DOCUMENTS 3,841,999 A * 10/1974 Bennett ................ A01K 63/045
210/167.26
4,027,627 A * 6/1977 Fillion ................... A01K 61/80
119/57.91
(Continued)

FOREIGN PATENT DOCUMENTS

CN 112772514 A * 5/2021
EP 1425963 A2 11/2006
(Continued)

*Primary Examiner* — Brady W Frazier
*Assistant Examiner* — Brook Victoria Schmid
(74) *Attorney, Agent, or Firm* — Christopher Quan (57) ABSTRACT

Provided are a multi-function device for intensive shrimp farming and intensive shrimp farming systems using this device. The system comprises: shrimp ponds (100) with brackish water pumped from rivers or seas then treated with chemicals, sedimentation and micro-organisms; at least one multifunction device (200) to generate water flow, dissolve molecular oxygen, deliver and dispense shrimp feed and provide solution containing minerals, micro-organisms and
(Continued)

other additives; pure oxygen supply device (300) capable of generating oxygen from the air to supply oxygen with purity higher than 90% to water in intensive culture pond to achieve consistently higher concentrations of dissolved oxygen saturated dissolved oxygen concentration; a network of porous sheets floats on the water to reduce the diffusion of oxygen molecules from the water to the air; and a network of lights for providing artificial light to change the feeding cycle of shrimp with industrial and natural food. The system according to the invention, with the integration of many parts (wherein the multi-function device is the most important), helps to highly automate the shrimp farming process, the parts are arranged reasonably, coordinate and operate flexibly to help the shrimp farming system be more active and high intensification, improve the efficiency in shrimp farming, and reduce production costs.

11 Claims, 9 Drawing Sheets

(58) Field of Classification Search
CPC ...... B01F 23/237611; B01F 23/237612; B01F 23/2376; B01F 23/231265; B01F 23/23123; B01F 23/231231; B01F 23/2312; B01F 23/23128; B01F 23/23; B01F 23/2311
See application file for complete search history.

(56) References Cited

U.S. PATENT DOCUMENTS

| | | | |
|---|---|---|---|
| 4,255,360 A * | 3/1981 | Jeffries | C02F 3/24 415/206 |
| 5,425,598 A * | 6/1995 | Pennington | B09C 1/02 588/249 |
| 6,187,194 B1 * | 2/2001 | Byrne | C02F 3/06 210/612 |
| 2009/0304449 A1 * | 12/2009 | Kerfoot | B09C 1/00 405/128.7 |
| 2020/0324256 A1 * | 10/2020 | Goi | B01F 25/4342 |
| 2021/0045364 A1 | 2/2021 | Huang | |

FOREIGN PATENT DOCUMENTS

| | | | | |
|---|---|---|---|---|
| JP | 2006025729 A | 2/2006 | | |
| WO | WO-0145869 A2 * | 6/2001 | .......... | B01F 3/04262 |
| WO | WO-2009026454 A2 * | 2/2009 | ............. | A01K 63/00 |
| WO | WO-2018081868 A1 * | 5/2018 | ................ | B01F 3/04 |
| WO | WO-2022076880 A1 * | 4/2022 | ............. | A01K 61/59 |
| WO | WO-2022261454 A1 * | 12/2022 | ............. | A01K 61/80 |

* cited by examiner

MULTI-FUNCTION DEVICE USED FOR INTENSIVE SHRIMP FARMING AND INTENSIVE SHRIMP FARMING SYSTEM USING THIS DEVICE

CROSS-REFERENCE TO RELATED APPLICATIONS

This application is a 371 national stage application of Patent Cooperation Treaty international application Ser. No. PCT/IB2022/053561, which claims priority to Vietnam patent application number 1-2021-06470. The contents of these applications are hereby incorporated by reference in their entireties.

FIELD

The invention relates to a multi-function device used in an intensive shrimp farming and an intensive shrimp farming system using this device. The system and device of the invention can be used for shrimp farming in general, but it is better to be used for whiteleg shrimp farming. The invention is a highly specialized intensive shrimp farming system which is capable of monitoring farming conditions, regulating the amount of dissolved oxygen ($O_2$) in water, and distributing food and nutrients.

BACKGROUND

Intensive farming is used in the whiteleg shrimp farming industry in Vietnam and other Asian countries. Circular and rectangular shrimp ponds lined with HDPE are increasingly used to increase the density of whiteleg shrimp farming. Commercial shrimp ponds typically contain between 1,000 and 2,000 m3 of treated brackish water with salinity ranging from 10 to 30 g/L with a depth of about 1.2 m at the edge and up to 1.8 m deep in the center with a siphon system.

The amount of dissolved oxygen in water is very important and necessary to enable the use of large amounts of feed in intensive shrimp farming. Most of the dissolved oxygen in water is used by the aerobic microorganisms in shrimp ponds to break down the proteins in shrimp manure and the organic compounds released during shrimp farming. Dissolved oxygen in water provides the oxygen necessary for aquatic animals, which is beneficial for the growing proliferation of aerobic microorganisms, which promotes decomposition of organic substances, reduces toxic substances, inhibits the activity of harmful anaerobic microorganisms, and boosts the immunity of shrimp. Low dissolved oxygen has a negative impact on shrimp's ability to catch prey and digest food. One of the methods used to help increase the amount of dissolved oxygen in shrimp ponds is to use mechanical systems to create oxygen for the pond.

Mechanical oxygen generating systems commonly used in Vietnam and other countries comprise of an air blower connected to a plural of oxygen diffusers located at the bottom of the pond, and a paddle wheel device floating on the water to mix air that contains about 20.5% oxygen into the water. The paddle wheel device is also used to centrifuge dead shrimp, shrimp shells, shrimp manure and organic compounds to the siphon system, which is then periodically sucked out of the pond.

During operation, the air blower will suck in and blow air through the diffusers to form bubbles that rise to the surface of the water. The paddle wheels on the water surface rotate to rip water into small droplets to increase the contact area between the air and the water to increase the dissolved oxygen in water.

The rate of dissolution of oxygen from the air into the water is described by the gas transfer equation below:

$$dC/dt = K_l(A/V) \cdot (C_s - C_m)$$

In which: dC/dt is the dissolution rate of oxygen in the air into the water;

$K_l$ is the water surface refresh constant depending on the turbulence rate of water;

A is the contact surface area between water and air of shrimp pond;

V is the water volume of shrimp pond;

$C_s$ is the saturated oxygen concentration depending on the temperature and salinity conditions of water;

$C_m$ is the measured oxygen concentration.

In practice, the oxygen generation system which consists of air blowers and a paddle wheel device operates 24 hours a day continuously to dissolve oxygen into the water. However, the dissolved oxygen concentration $C_m$ in water never exceeds the saturation oxygen concentration $C_s$ because when $C_m$ equals $C_s$, then dC/dt=0. In other words, the rate of oxygen from the air dissolving into the water is equal to the rate of the oxygen in the water evaporates into the air.

The current use of mechanical oxygen generation systems is very energy intensive. An average of 4,500 to 5,500 kWh of electricity is needed to dissolve oxygen for one ton of shrimp harvested in one crop.

Therefore, the brackish whiteleg shrimp farming industry urgently needs a type of shrimp farming system that can operate at a higher dissolved oxygen concentration in the pond than the saturated oxygen concentration to increase the density of shrimp culture per $m^2$ in intensive shrimp farming industry and reduce electrical energy consumption.

SUMMARY

The purpose of the present invention is to overcome limitations related to dissolved oxygen concentrations in shrimp ponds. To achieve this goal, according to one aspect of the invention, there is provided a multi-function device used for intensive shrimp farming, the device comprising:

support frame for supporting (or anchoring) the remainder parts of the device;

water flow generator for creating water flows in layers with a decreasing volumetric flow rate from the bottom to the surface of the shrimp pond, comprising impeller driven by motor (for stirring to create the water flows) through the drive shaft, the body covering outside of said impeller is configured to have a flat plate curved in a semicircle for catching the water flow inside, the whole said body has a screw-shaped tubular structure that is convenient for creating and guiding water flows;

feeder unit for providing industrial and functional food for shrimp, comprising the first container, the lid above the first container, food sensor inside said first container which can sense the amount of food inside, the feed output below said first container, the feed dosing motor is placed on the top of said feed output;

substances-supplying unit for delivering substances such as minerals, micro-organisms and other additives into the shrimp pond environment, comprising a second container, a crossbar connecting the two ends cross section of the open of said second container, a stirring motor located in the middle of the said crossbar, the pipe below said second container for leading the solution of substances to the outlet, automatic valve located on the said pipe for controlling the amount of substance to be supplied;

gas dissolving unit for diffusing oxygen into water, comprising of a porous ceramic tube, a stainless steel pipe placed inside said porous ceramic tube, the gap between said stainless steel pipe and the inner wall of said porous ceramic tube is filled with sand, the stainless steel bar is arranged around said porous ceramic tube, wherein these are held together through rubber fastener, round flat stainless steel plate, bolt and rivet;

sensor for measuring water quality including dissolved oxygen concentration, pH, salinity, water temperature, turbidity, and sunlight;

controller for operating the multi-function device, which connects and communicates with other components via wiring and/or wireless communication such as by 802.11x-based wireless communication networks (e.g. Wi-Fi® from Wi-Fi Alliance), 3G, 4G or long-range radio frequency wireless modulation technologies (e.g. LoRa® developed by Semtech Corporation), wherein said controller being operable to receive, from the sensor, system data information, then determines and adjusts the appropriate parameters, and transmits the information to the components to enable the components to operate according to defined parameters.

In one or more embodiments of the multi-function device, the porous ceramic tube has pores with size less than 1.0 micrometer, the sand particles have a diameter between 0.5 and 2.0 mm, and stainless steel bars are arranged at an angle of 37 degrees around the porous ceramic tube.

In one or more embodiments of the multi-function device, the water flow generator is operated at volumetric flow rate between 50 and 1,000 m³/h for intensive shrimp pond containing brackish water of 100 to 2,000 m³.

In one or more embodiments of the multi-function device, said device further comprises an indicator light connected and communicates with the controller to generate alarm signals in different modes.

In one or more embodiments of the multi-function device, the controller connects and communicates with the external device through the host server to allow the user to operate and control remotely.

The other aspect of the invention is an intensive shrimp farming system, which comprises of:

shrimp ponds with brackish water pumped from rivers or seas, then treated with chemicals, sediments and microorganisms;

at least one multi-function device for generating water flow, dissolving molecular oxygen, delivering and dispensing shrimp feed and providing solution containing minerals, micro-organisms and other additives;

a pure oxygen supply device that generates oxygen from the air to supply oxygen with purity higher than 90% to the water in intensive culture ponds; and a network of porous sheets floating on the water to reduce the diffusion of oxygen molecules from the water to the air.

In one or more embodiments of intensive shrimp farming system, the system further comprises a network of lights that provides artificial light to change the feeding cycle of shrimp with industrial and natural food.

Preferably, the system operates at a dissolved oxygen concentration that is always higher than the saturated dissolved oxygen concentration which is common in current shrimp farming.

Preferably, the network of porous sheets consists of porous sheets with density less than 1 g/L and to be fixed together.

Preferably, porous sheets are made of polyethylene, polypropylene, polyurethane materials with various colors and thicknesses ranging from 5 mm to 50 mm.

Preferably, the network of lamps comprises lights with wavelengths between 380 and 580 nm, incorporating LEDs emitting purple (wavelength of 380 nm), blue (wavelength of 450 nm), green (wavelength of 510 nm) and yellow (wavelength of 580 nm).

Preferably, the network of lights is automatically turned on with gradually increasing intensity at least 2 hours before sunrise and gradually decreases intensity and is completely turned at least 2 hours after sunset.

Preferably, the network of lights provides additional artificial light for at least 4 hours before and after sunrise and sunset.

The shrimp farming system of the invention, with its superior ability to provide dissolved oxygen through the pure oxygen supply device and the gas dissolving unit with special structure, its ability to resist oxygen diffusion thanks to the network of porous sheets, . . . helps to overcome the inherent limitation of oxygen solubility in pond water, i.e. the dissolved oxygen concentration $C_m$ in the water never exceeds the saturated oxygen concentration $C_s$, which is a crucial problem in shrimp farming in general. In addition, with the integration of many parts (wherein the multi-function device is the most important), the system helps to highly automate the shrimp farming process, the parts are arranged reasonably, coordinate and operate flexibly to help the shrimp farming system be more active and high intensification, improve the efficiency in shrimp farming, and reduce production costs.

Explanation of reference numbers: 100 shrimp pond; 110 wall of shrimp pond; 120 siphon system; 130 pond water level; 140 water flow direction in shrimp pond; 200 multi-function device; 202 support frame; 204 motor (stirring to create the water flow); 206 drive shaft; 208 indicator light; 210 sensor; 220 water flow generator; 222 body (of water flow generator); 224 impeller; 226 discharge port; 228 air channel; 230 gas dissolving unit; 232 porous ceramic tube; 234 stainless steel pipe; 236 sand layer (to even out the flow of gas molecules); 238 rubber fastener; 240 stainless steel bar; 242 stainless steel piece; 244 bolts; 246 rivet; 248 air channel receiver; 250 feeder unit; 252 first container; 254 lid; 256 food sensor; 258 motor (feed dosing); 260 feed output; 270 substances-supplying unit; 272 second container; 274 motor (stirring, dissolving and mixing the solution); 276 automatic valve; 278 conduits of substances; 280 output (substance solution conduit); 290 controller; 300 pure oxygen supply device; 310 air channel system; 400 pure carbon dioxide ($CO_2$) supply device; 500 porous sheets; 600 lights

DETAILED DESCRIPTION

The scope of protection of the invention will become clearer with the following detailed description. However, it should be understood that detailed descriptions and specific examples, which indicate preferred embodiments of the invention, are given for illustrative purpose only, and the present invention is not limited thereto. The various modifications and changes within the scope and spirit of the invention is obvious to those skilled in the art to which the present invention pertains.

Figure 1A:
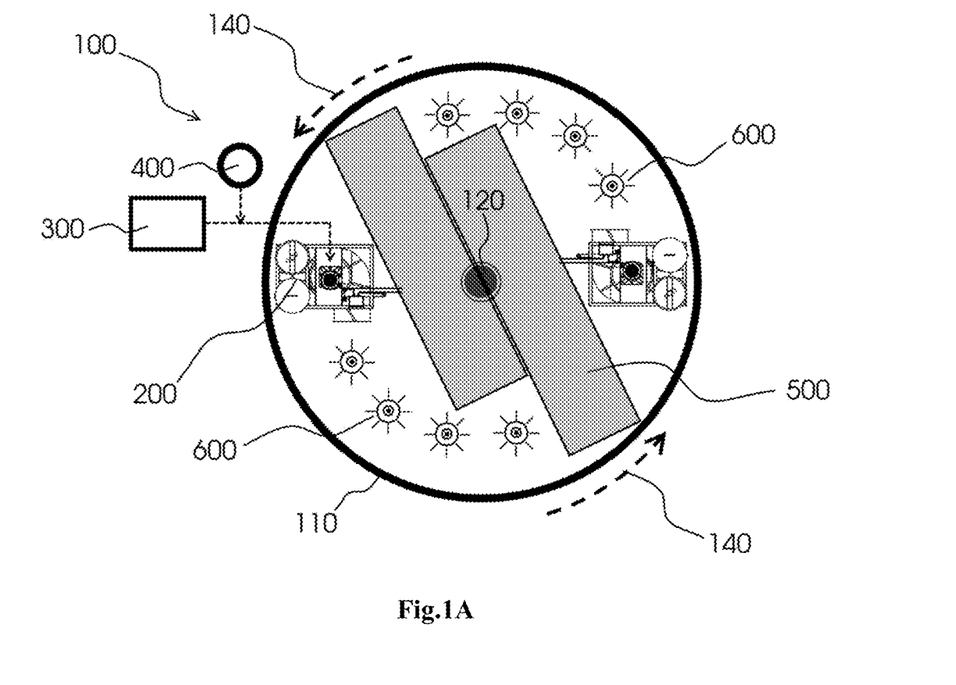
FIG. 1A shows the top view of an intensive shrimp farming system according to an embodiment of the present invention.
Figure 1B:
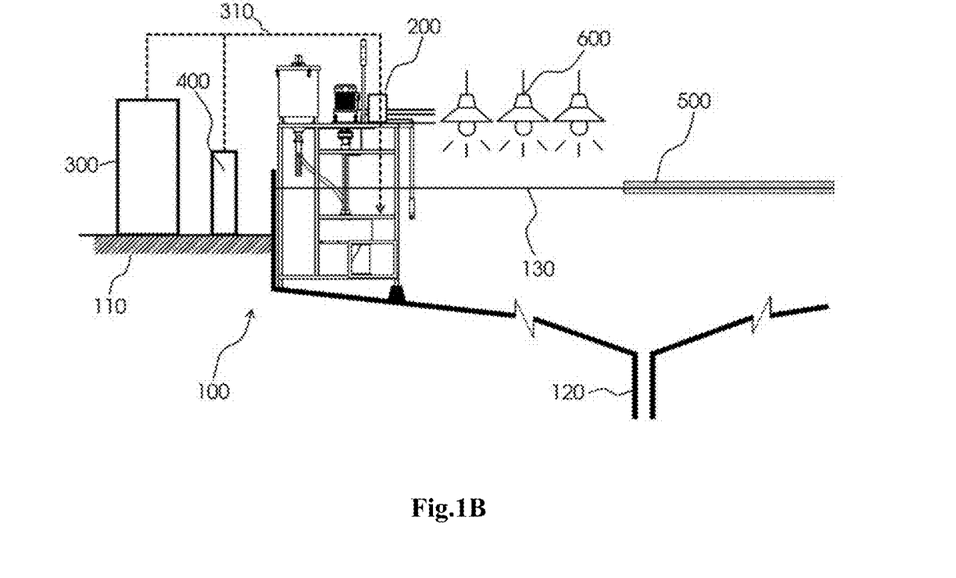
FIG. 1B shows the side view of an intensive shrimp farming system according to an embodiment of the present invention.

Referring to FIG. 1A and FIG. 1B, the system comprises: shrimp ponds (100); multifunction device (200) which is able to generate water flow, dissolve molecular oxygen, deliver and dispense shrimp feed and provide solution containing minerals, micro-organisms and other additives; pure oxygen supply device (300) (the purity of oxygen higher than 90%); pure carbon dioxide ($CO_2$) supply device (the purity of $CO_2$ higher than 90%); a network of porous sheets floating on the water to reduce the diffusion of oxygen molecules from the water to the air and to sunshade; and a network of lights for behavior modification of shrimp.

Shrimp Pond

Shrimp pond 100 has a circular surface, but it is not limited to that, specifically shrimp pond 100 can have other shapes of surface such as rectangular, square or polygonal shape depending on needs and scale ordered by shrimp farm owners. In the middle of shrimp pond 100, there is a siphon system 120 (which is a common structure and not described here). Shrimp were reared in shrimp ponds 100 containing brackish water with a higher dissolved oxygen concentration than saturated dissolved oxygen at any temperature, salinity and barometric pressure.

Brackish Water

The intensive shrimp farming system of this invention consists of brackish water obtained from a river or sea and treated with chemicals including KMnO4, benzalkonium chloride and acetic acid. Then polyaluminum chloride is added to help settle the suspended particles in the water. The brackish water, after settling, is treated with chlorine and filtered through sand and be ready for use in shrimp farming.

Preferably, brackish water has salinity between 5 and 30 g/L, pH between 6.0 and 9.0 and alkalinity greater than 80 mg/L.

Preferably, brackish water contains macro-minerals including cationic compounds of Ca, K, Mg, P and trace minerals including cation-containing compounds of Co, Cu, Fe, I, Mn, Se, Zn and the alkalinity of brackish water in shrimp ponds is between 80 and 250 mg/L.

Preferably, brackish water also contains algae to provide oxygen through photosynthesis with natural or artificial light and to play a role as natural food for shrimp. The following algae are preferentially present in shrimp culture water with concentrations of 103 to 105 CFU/ml:

Green algae: *Chlorella* sp., *Nannochloropsis* sp., *Scenedesmus* sp., Monoraphidium *contortum*, *Chlamydomonas* sp., Ankistrodesmus sp., *Haematococcus* sp., *Dunaliella* sp., Oocystis sp., *volvox* sp. và *ulothrix* sp.

Diatom algae: *Thalassiosira* sp., *Chaetoceros* sp., Eunotia sp., *Isochrysis* sp., Skeletonema sp., *Nitzschia* sp. và *Navicula* sp.

*Spirulina* algae: *Spirulina* sp.

Preferably, brackish water in shrimp ponds 100 according to this invention also includes microorganisms with various functions including:

Microorganisms for environmental treatment, organic decomposition and toxic gas treatment:

*Bacillus subtilis* sp., *Bacillus licheniformis, Bacillus coagulans, Bacillus amyloliquefaciens, Bacillus pumilus, Streptomyces* sp., *Rhodopseudomonas* sp., *Nitrobacter* sp., *Nitrosomonas* sp. and other microorganisms with similar functions.

Microorganisms that support digestion, increase resistance, resist harmful bacteria:

*Lactobacillus* sp., *Lactobacillus plantarum, Lactobacillus acidophilus, Bacillus subtilis* sp., *Bacillus licheniformis, Saccharomyces* sp., *Saccharomyces cerevisiae, Saccharomyces boulardii* and other microorganisms with similar functions.

Multi-Function Device 200

Figure 2:
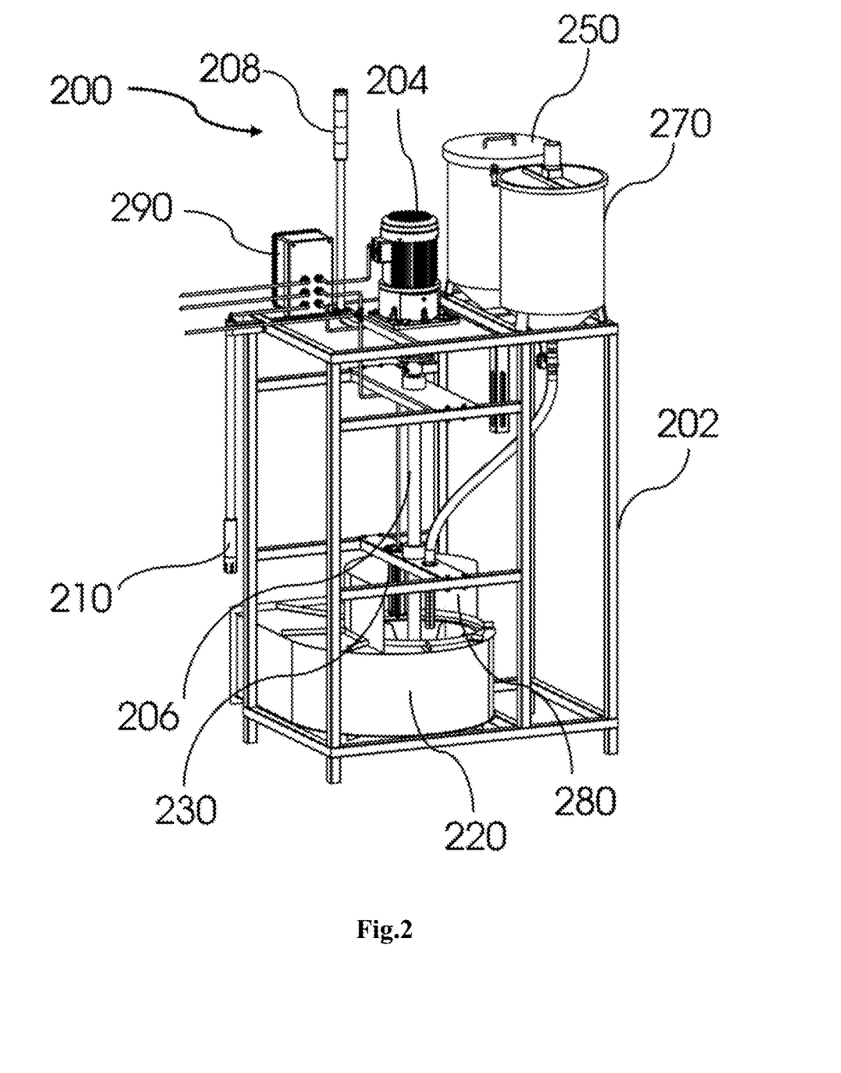
FIG. 2 shows the structure of the multi-function device of the present invention.

Refer to FIG. 1A, FIG. 1B and FIG. 2, the multi-function device 200 of the present invention (partially immersed in water) comprises support frame 202, flow generator 220, sensor 210 for measuring water quality including dissolved oxygen concentration, pH, salinity, water temperature, turbidity, sunlight, algae density, feeder unit 250, substances-supplying unit 270 for delivering substances such as minerals, micro-organisms and other additives, gas dissolving unit 230 for diffusing oxygen and/or carbon dioxide molecules into water.

Figure 3:
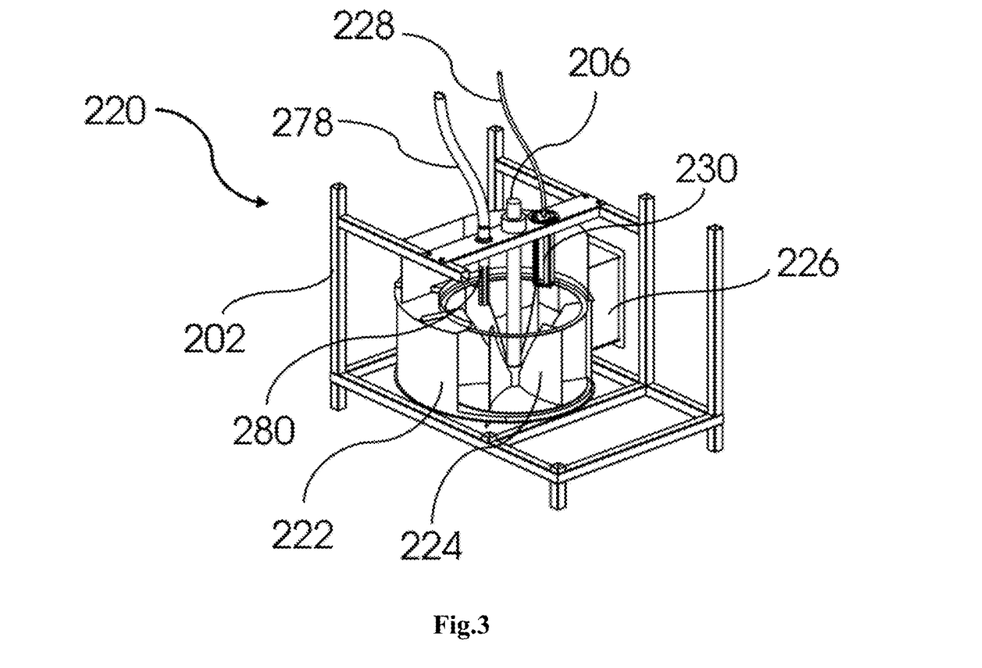
FIG. 3 shows the structure of the water-flow generator of the multi-function device of the present invention.

Referring to FIG. 1B, the water flow generator 220 is located close to the bottom of the shrimp pond 100. Refer to FIG. 3, said water flow generator 220 comprises impeller 224 which is driven by the motor 204 for stirring to create the water flows (3.7 kW, 380 V) through drive shaft 206; outside of the impeller 224 is the body 222 of the water flow generator 220, the upper of body 222 is designed to be a flat plate curved in semicircle shape, for catching water flow inside, and the entire part of the body 222 is in a screw-shaped tubular structure that is convenient for creating and guiding water flows. The flow generator 220 is designed to create water flows in layers with a decreasing volumetric flow rate from the bottom to the surface of the shrimp pond. Preferably, the water flow generator (220) is operated at volumetric flow rate where the water at the air-water interface has the slowest possible flow rate to avoid any turbulence that could increase diffusing oxygen in the water into the air. Preferably, the volumetric water flow rate is between 50 and 1,000 m$^3$/h for intensive shrimp pond 100 containing brackish water of 100 to 2,000 m$^3$.

Figure 4:
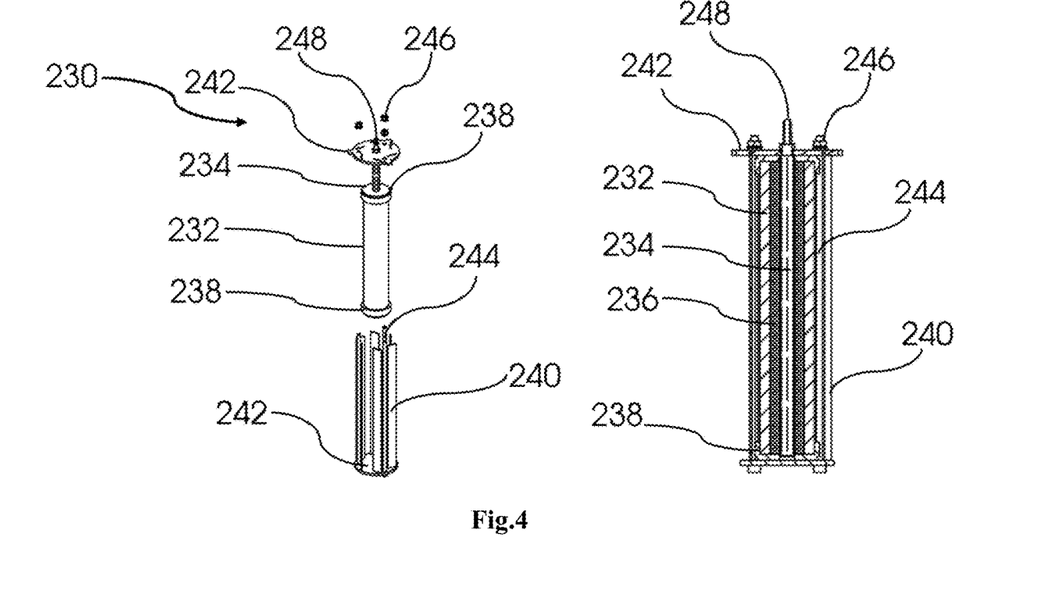
FIG. 4 shows the structure of the gas-dissolving part of the multi-function device of the present invention.

Referring to FIG. 4, the multi-function device 200 of the present invention comprises at least gas dissolving unit 230 for diffusing oxygen into water, located at the inlet of the water flow and placed above the impeller 224 of the water flow generator 220. The gas dissolving unit 230 is connected to the pure oxygen supply device 300 through the air channel system 310. The gas dissolving unit 230 consists of a porous ceramic tube 232, which has pores with size less than 1.0 micrometers (purchased from Doulton Water Filters, Singapore under the trade name Doulton Sterasyl Slimelin Microfilter, 10" diameter opening at both ends), a stainless steel pipe 234, which has small holes, placed inside the porous ceramic tube 232, the gap between the stainless steel pipe 234 and the wall of the porous ceramic tube 232 is filled with sand, wherein sand grains has diameter of 0.5 to 2.0 mm to help control the flow of oxygen gas easily, 6 stainless steel bars 240 (but not limited to) are arranged at an angle of 37 degrees around the porous ceramic tube 232. The role of the stainless steel bar 240 is to increase the speed and to drive the water flow when it comes into contact with the porous ceramic tube 232 in order to help dissolve molecular oxygen into water faster, all said parts of gas dissolving unit 230 are held together by rubber fastener 238, two flat round stainless steel pieces 242, three bolts 244 and three rivets 246.

Refer to FIG. 2, sensor 210 is designed in the form of a cylinder (but not limited to), one end (bottom) of sensor 210 is submerged in water of shrimp pond 100, inside this end there are sensor chips, the other end (upper) has a wire connection to transmit information to the electronic controller 290. The sensor 210 of the present invention is used to measure pH, salinity, dissolved oxygen concentration, water level and algae concentration of water in shrimp pond 100.

Figure 5:
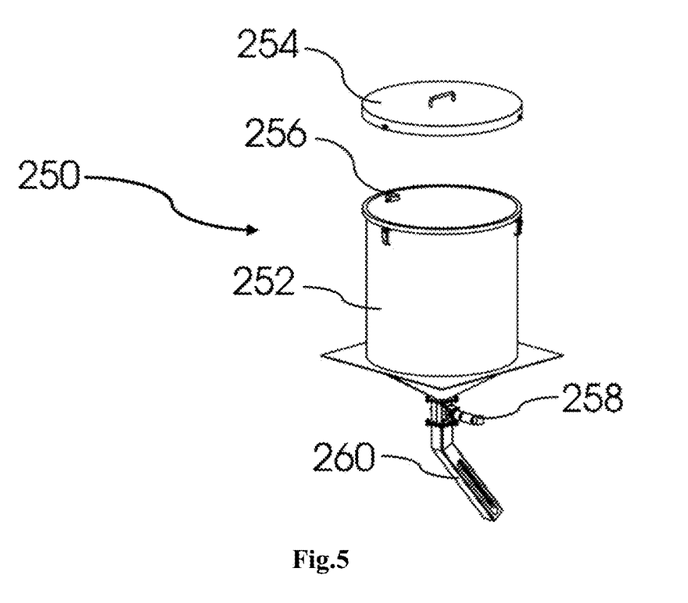
FIG. 5 shows the construction of the feeder unit of the multi-function device of the present invention.

Referring to FIG. 5, feeder unit 250 for providing industrial and functional food for shrimp. The feeder unit 250 comprises the first container 252 consisting of two parts: a cylindrical upper part and a conical lower part, above the first container 252 there is a lid 254, inside the first container 252 there is a 256 possible sensor for sensing the amount of food remaining in the first container 252, below the first container 252 there is a feed outlet 260. The feed outlet 260 is a square box-shaped tube (but not limited) and can be directed straight down or diagonally toward the position of the water flow generator 220 (thanks to the suction force in the water flow generator 220, the food is sucked in). In addition, on the top of the feed outlet 260, a motor 258 for feed-dosing can be arranged to measure and supply an accurate amount of feed into shrimp pond 100.

Figure 6:
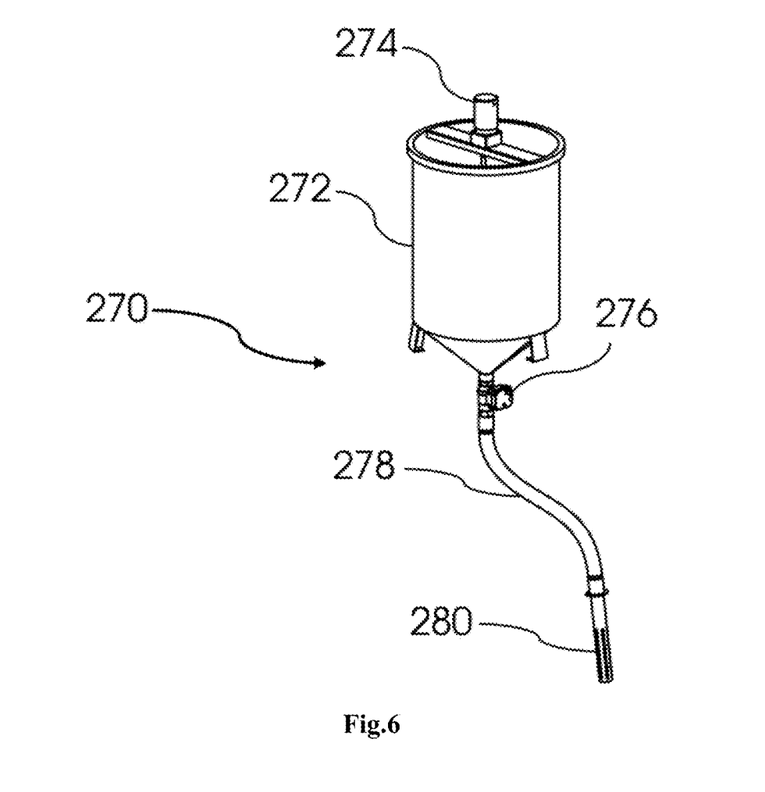
FIG. 6 shows the structure of the substances-supplying unit of the multi-function device of the present invention.
Figure 7:
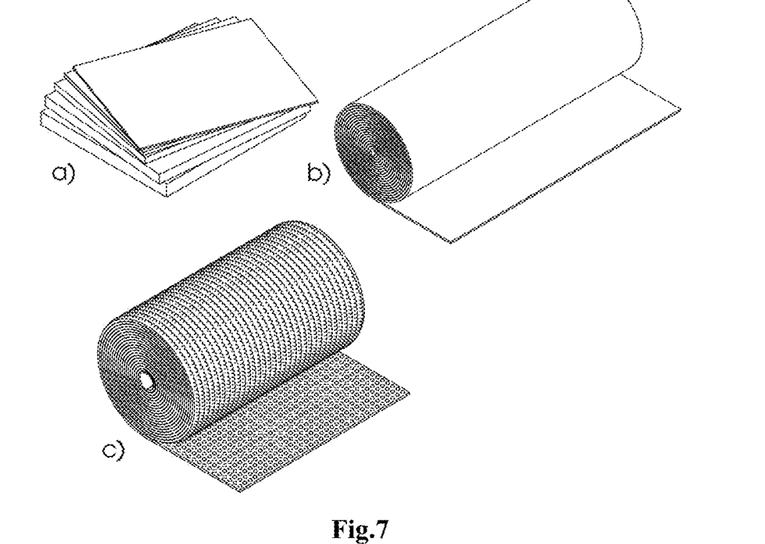
FIG. 7 shows the types of materials that can be used to make porous sheets for the network of porous sheets floating on the water, in which a) and b) are rigid and flexible polymer porous sheets and c) is porous bubbled polymer films.

Referring to FIG. 6, substances-supplying unit 270 for supplying mineral and microbiological solution to shrimp pond 100, comprising the second container 272 for receiving and holding mineral solution or other necessary substances for shrimp farming such as water treatment solution, microbiology, pH adjustment. . . . Depending on the needs of use and the compatibility between the substances, the substances put into the container can be one type or it can also be combination of different types. Above the second container 272 is open and there is a crossbar connecting two points of cross section of the open of said second container, a motor 274 for stirring the substance inside the second container is arranged in the middle of the said crossbar. Underneath the second container is the pipe 278 for leading the mineral solution, microorganisms and other additives to the outlet 280 before these substances enter the shrimp pond 100. An automatic valve 276 is located at the top of pipe 278 to control the amount of substance supplied to shrimp pond 100. The second container 272 can operate independently or in combination with the first container 271. More specifically, the two containers are not always working at the same time (and usually will not work at the same time), but depending on the characteristics and depending on the time, they will work in combination, for example they can be used at the same time to supplement microorganisms and feed into the pond.

A controller 290 is provided for operating the whole multi-function device 200. Said controller 290 connects and communicates with other components via wiring and/or wireless communication such as by an 802.11x-based wireless communication network (e.g. Wi-Fi® from Wi-Fi Alliance), 3G, 4G or a long-range radio frequency wireless modulation technology (e.g. LoRa® developed by Semtech Corporation). Said controller 290 has a processor being operable to receive, from the sensor, system data information, then analyze and determine the appropriate parameters for shrimp pond 100, and transmit the signal to the components to enable the components to operate according to defined parameters. Specifically, sensor 210 measures quality indicators of water in shrimp ponds 100, the measured values will update to the controller 290 every 15 to 180 minutes. The processor of the controller 290 will analyze, evaluate, and then make appropriate operating requirements for the multi-function device 200 and the entire system in general. For example, when the dissolved oxygen concentration value falls below the "allowed value", the data is transmitted to the controller 290 for analysis and then the controller 290 turns on pure oxygen supply device 300 to deliver oxygen through the gas solubilizer 230 to the water column inside the body 222 of the water flow generator 220 to dissolve into the pond. When the concentration of dissolved oxygen in water increases above the "allowable value", the sensor 210 will transmit information to the controller 290 for analyzing and then the controller 290 stops pure oxygen supply device 300, this mechanism is to control the concentration of dissolved oxygen in the water at the allowable threshold and save energy. This mechanism applies similarly to control concentration of other substances in shrimp pond 100. The controller 290 with integrated microprocessor can operate the entire system independently, however the invention is not limited by that. As mentioned above, inside the control box is an electrical circuit, connected to the internet via an 802.11x-based wireless communication network (e.g. Wi-Fi® from Wi-Fi Alliance), 3G, 4G and/or a long-range radio frequency wireless modulation technology (e.g. LoRa® developed by Semtech Corporation), so the controller 290 can completely connect and communicate with an external server and/or users can remotely control the operation of the system indirectly through the controller 290.

In addition, refer to FIG. 2, the multi-function device 200 of the present invention includes the indicator light 208. The indicator light 208 can connect and communicate with the controller 209 to generate alarm signals in different modes. For example, when the oxygen concentration in the pond is high, the indicator light 208 plays red continuously, when the food in the first container is almost empty, the indicator light 208 plays blue continuously.

Pure Oxygen Supply Device 300;

The intensive shrimp farming system of this invention includes a device for providing molecular oxygen with a purity of more than 90%. The device used in this invention, based on pressure swing adsorption technology, is manufactured by RYNAN® Technologies Vietnam under the name of RYNAN® OXYGEN GENERATOR M300. The capacity of this equipment machine is 40 L/min with oxygen purity higher than 90%. Oxygen molecules from the device are directed to the Gas dissolving unit 230 through the air channel system 310 with a flow rate from 1 to 30 L/min. Preferably, the ratio between water flow rate and molecular oxygen flow rate varies from 1,500 to 2,000 to avoid oxygen molecules from forming air bubbles and evaporating to the surface of the water. More preferably, the pure oxygen supply device 300 is controlled by the controller 290 to operate in cooperation with other devices so that the dissolved oxygen concentration in shrimp pond 100 is always higher than the saturated dissolved oxygen concentration, which is common in current shrimp farming. And more preferably, at least 1 mg/L higher than the saturated dissolved oxygen concentration.

In addition to the pure oxygen supply device 300, it is possible to set up the pure carbon dioxide supply device, using the same air channel system 310 to lead the gas into the shrimp pond 100. This device works in some specific cases, with the purpose of providing carbon dioxide for algae, because during photosynthesis, algae uses carbon dioxide to produce oxygen molecules.

A Network of Porous Sheets Floating on the Water

The intensive shrimp farming system of this invention consists of a network of a network of porous sheets 500 floating on the water surface with the function of reducing the diffusion of oxygen molecules from the water to the air. These porous sheets have a density less than 1.0 g/L.

Preferably, porous sheet 500 made of polyethylene, polypropylene, polyurethane materials of various colors with thicknesses from 5 mm to 50 mm. In addition, porous sheet 500 can be polyester-cotton fabric with a thickness of 1 to 5 mm. Said porous 500 can also be a double-sided polyester mesh fabric with a polyethylene and polypropylene plastic layer commonly used for construction waterproofing.

The porous sheet 500 used in this invention may be fixed with lanyards.

A Network of Lights 600

The intensive shrimp farming system of this invention may also include a network of lights 600 for shrimp pond 100 with the purpose of stimulating shrimp to eat more industrial food when the light is on.

Whiteleg shrimp raised in commercial intensive culture ponds are omnivores and eat continuously. Meanwhile, shrimp eating habits also change depending the time of day and night. During the day, about an hour after sunrise, shrimp gather and move in flocks, then combine in a swarm and always move on the bottom and around the pond walls in search of food. Under natural light, shrimp prefer to eat industrial feed in the form of pellets with a diameter varying from 0.5 to 5 mm depending on the age of the shrimp. At night, when the sun goes down, the eating behavior of whiteleg shrimp changes completely. Shrimps prefer to eat natural foods such as algae and zooplankton rather than industrial feed. Therefore, a network of lights can be used to change the omnivorous behavior of whiteleg shrimp.

Many studies reported that blue (450 nm wavelength) and green (510 nm wavelength) light helps shrimp grow quickly and have the highest survival rate. Therefore, the network of lights in the intensive shrimp ponds of this invention has a wavelength from 380 to 580 nm, combining 4 types of LEDs emitting purple (wavelength of 380 nm) and blue (wavelength of 450 nm), green (wavelength of 510 nm) and yellow (wavelength of 580 nm). In each light used in this invention there are a number of LEDs including: 5 purple LEDs, 40 blue LEDs, 50 green LEDs and 5 yellow LEDs.

Preferably, the network of lights is gradually turned on at least 2 hours before sunrise and dimmed and turned off at least 2 hours after sunset. More preferably, the network of lights provides additional artificial light for at least 4 hours before and after sunrise and sunset.

EXAMPLES OF INVENTION IMPLEMENTATION

Experimental Example 1 (Pond No. 1)

In this experimental example, an intensive shrimp farming system is set up with the following conditions:

Shrimp Pond

The shrimp pond has a scale of 100 $m^3$ brackish water, covered with HDPE film, has a radius of 6 m, a depth of 1.2 m around the wall and slopes down to 1.5 m in the center where the siphon system is located.

Brackish Water Source

Shrimp pond contained 100 $m^3$ of brackish water, the properties of brackish water were kept constant throughout the shrimp culture period and were summarized in Table 1:

TABLE 1

Desired properties of brackish water in experimental pond.

| Description | Desired properties |
| --- | --- |
| Shrimp farming scale | 100 $m^3$ |
| Volume of water change | 8 $m^3$ per day |
| Salinity | 12-22 g/L |
| pH | 7.2-8.5 |
| Alkalinity | 140-200 mg/L |
| Turbidity | 2-10 NTU |
| Dissolved Oxygen (DO) | 10.0-15.0 mg/L |
| Water temperature | 28-32° C. |
| Microorganism | $10^3$-$10^5$ CFU/mL |
| Algae *Nannochloropsis* sp., *Haematococcus* sp., *Dunaliella* sp. | $10^3$-$10^5$ CFU/mL |

In detail, brackish water in shrimp pond contains a mixture of bacteria and actinomycetes that treat organic substances and residues, participate in the metabolism of toxic gases $NH_3$, $NO_2$, $H_2S$. In addition, they also create protein-containing floc particles that provide natural food for shrimp. These bacteria and actinomycetes are provided in MICRAQUA products supplied by Mylan Joint Stock Company, Tra Vinh, which includes *Bacillus subtilis* sp., *Bacillus licheniformis, Bacillus coaglulans, Bacillus amyloliquefaciens, Bacillus pumilus, Streptomyces* sp., *Rhodopseudomonas* sp., *Nitrobacter* sp. and *Nitrosomonas* sp. The MICRAQUA solution have a microbial density of about $10^7$-$10^9$ CFU/mL.

The water in the shrimp pond contains the algae *Nannochloropsis* sp., *Dunaliella salina* sp. and *Haematococcus pluvialis* with β-carotene, and astaxanthin in high rate and a total density of $10^3$-$10^5$ CFU/mL. These algae were purchased from Mylan Group (Tra Vinh) in liquid biomass with a density of $10^4$-$10^6$ CFU/mL of algae in the product.

Pure Oxygen Supply Device

The pure oxygen supply device used in this experiment is the RYNAN® OXYGEN GENERATOR M300 provided by RYNAN® Technologies Vietnam (Tra Vinh) with a capacity of 40 L/min of oxygen with a purity of over 90%. Oxygen is supplied to the oxygen diffuser to dissolve in water with a flow rate that can be set automatically according to the desired dissolved oxygen concentration in the water. In this experimental example, the dissolved oxygen concentration in water of shrimp pond was 10.0-10.5 mg/L.

Multi-Function Device

The system comprises a multi-function device with a water flow generator which can create flow rate vary from 3,000 to 6,000 L/min; feeder unit which can be set automatically to feed shrimp with volume of 100 to 1,000 grams at one time, then stop feeding for 5 minutes and start feeding again, shrimp are fed with mixture the feed consisting of 80% shrimp food Gold 6804 (CP Vietnam Animal Feed Group, Ben Tre) and 20% functional food for shrimp Functional Gold 100 (RYNAN® Smart Fertilizers, Tra Vinh); the sensor which is RYNAN® MPROBES 100 device provided by RYNAN® Technologies Vietnam (Tra Vinh); the gas dissolving unit which is capable of diffusing oxygen efficiently and is connected to a pure oxygen supply device.

During the cultivation process, parameters of light intensity, dissolved oxygen concentration, pH, salinity and water temperature are always monitored, measured through sensor and automatically updated to the internet and stored on the server at the Data Center of RYNAN® Technologies Vietnam (Tra Vinh) every 15 minutes.

By analyzing and evaluating the mentioned data on the server, the processor offers optimal operating plans for the system.

The dissolved oxygen is set to operate automatically with a concentration of 10.0 to 10.5 mg/L. Oxygen with purity of more than 90% is supplied from the pure oxygen supply device with the flow rate set from 2.0 to 3.0 L/min to the gas dissolving unit. The oxygen supply valve automatically opens when the dissolved oxygen concentration in the shrimp pond is lower than 10.0 mg/L and automatically closes when the dissolved oxygen concentration is higher than 10.5 mg/L. The water flow generator is set to automatically generate a water flow rate of 3,000 to 6,000 L/min. The ratio between water flow rate and molecular oxygen flow rate varies from 1,500 to 2,000 to avoid oxygen molecules from forming air bubbles and evaporating to the surface of the water.

Figure 9:
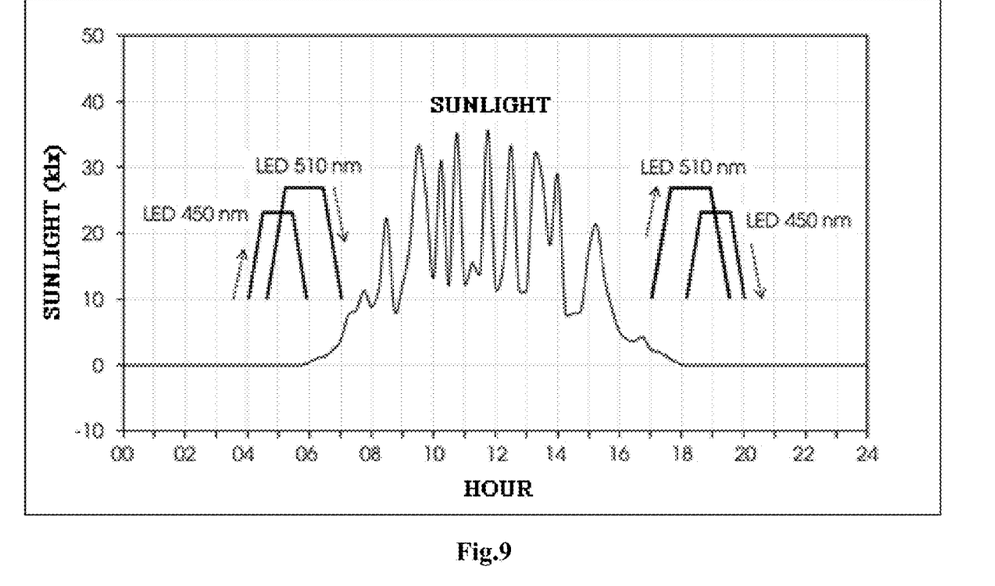
FIG. 9 shows a diagram depicting the process of adjusting on and off time of lights for the intensive shrimp farming system in experimental example 2 of the present invention.
Figure 10:
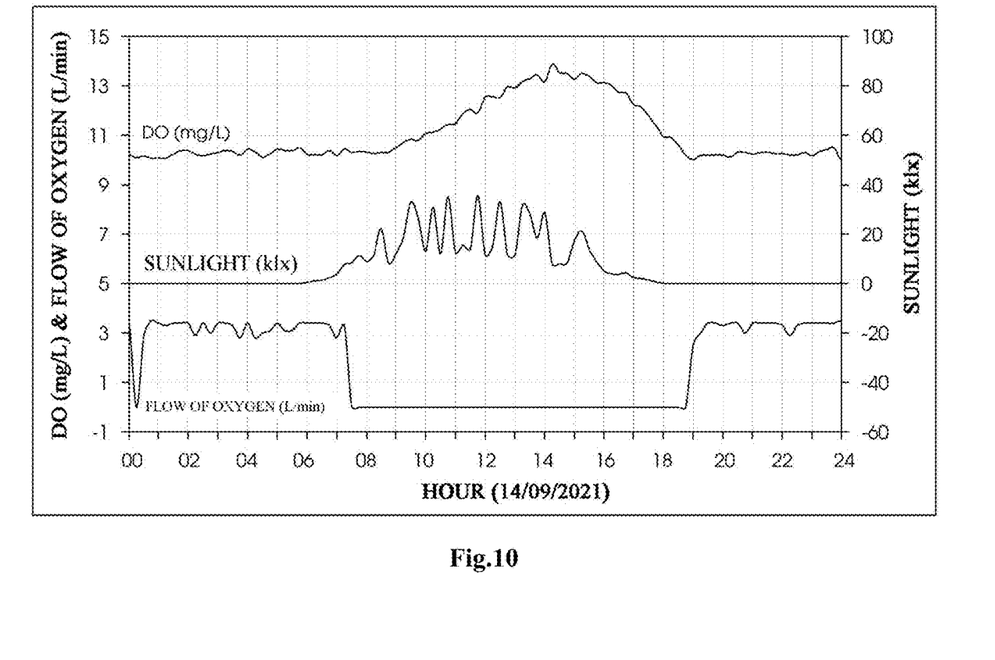
FIG. 10 shows a graph depicting changes in dissolved oxygen concentration in water, sunlight intensity and oxygen flow rate added to the experimental intensive shrimp ponds collected on Sep. 14, 2021.

Every day the sun rises around 6:00 and sets around 18:00. The intensity of sunlight gradually increases and peaks at midday, then decreases according to the solar cycle. The highest light intensity of Sep. 14, 2021 was measured at 35,710 lux at 11:45. The light intensity changes and decreases with the condition of the clouds (see FIG. 9). On the same day, the dissolved oxygen concentration started to increase gradually from 8:45 and reached the highest concentration of 13.89 mg/L at 14:15, then gradually decreased to 10 mg/L at 18:30. The increasing concentration of dissolved oxygen in water is due to the photosynthesis of algae in shrimp ponds. The pure oxygen supply device stops supplying molecular oxygen to the pond from 7:15 to 18:45. It can be seen that, in the presence of sunlight, the intensive shrimp farming system of this invention does not need to be supplied with molecular oxygen and saves energy (see FIG. 10).

Figure 11A:
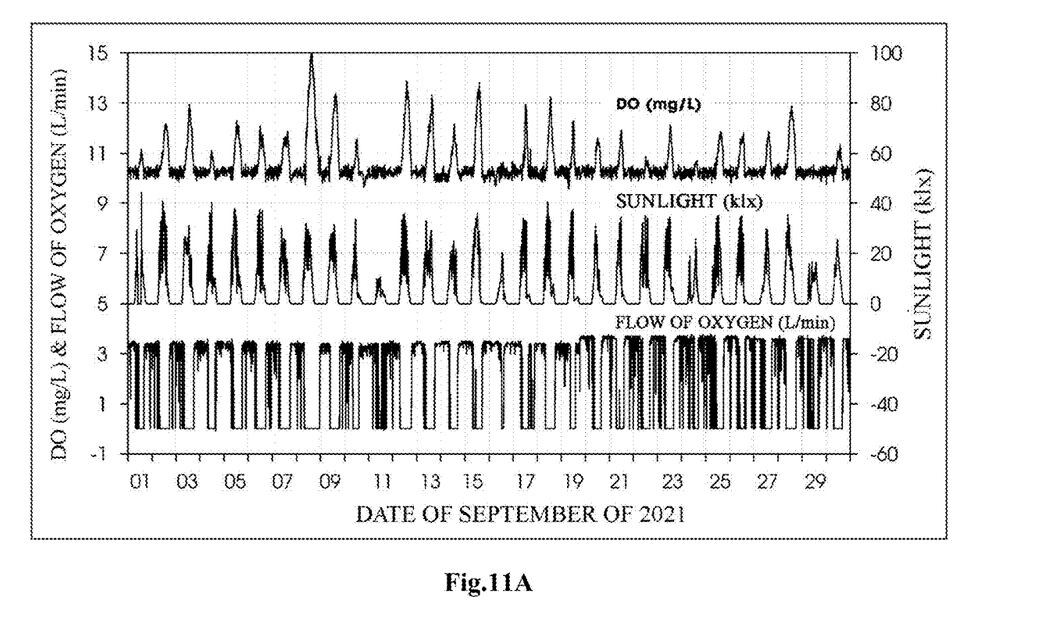
FIG. 11A shows a graph depicting changes in dissolved oxygen concentration in water, sunlight intensity and oxygen flow rate added to the experimental intensive shrimp ponds collected from Sep. 1, 2021 to Sep. 30, 2021.

On Sep. 11 and 29, 2021, because it was raining and cloudy, the intensity of sunlight was relatively weak, algae did not photosynthesize strongly to produce a lot of oxygen. Therefore, the pure oxygen supply device must deliver oxygen into the pond seemingly throughout the day. On other normal sunny days, the pure oxygen supply device does not have to deliver molecular oxygen into the pond for at least 8 hours per day (see FIG. 11A). Therefore, the energy used to supply oxygen into the pond is reduced by at least 33.0% compared with shrimp farming systems equipped with water fans and air blowers.

Figure 12:
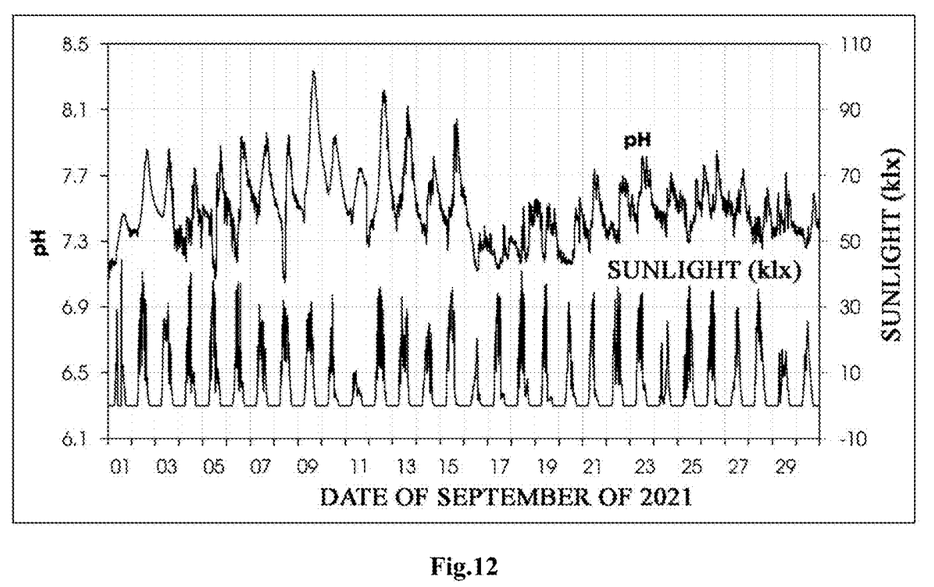
FIG. 12 shows a graph depicting changes in pH and sunlight intensity in intensive shrimp ponds collected from Sep. 1, 2021 to Sep. 30, 2021.

During photosynthesis, algae use carbonic acid to produce oxygen molecules, so the pH of the water increases gradually. Under the shrimp pond operating conditions of this experiment, the pH varied in the desired range from 7.0 to 8.4 (see FIG. 12).

A Network of Porous Sheets Floating on the Water

The double-layer polyethylene air bubble film is used as a foam sheet on the water surface to reduce the diffusion of oxygen molecules into the air above the water surface. The area of foam sheet in the experimental pond covered 50% of the surface area.

Experimental Example 2 (Pond No. 2)

In this experimental example, the conditions of the intensive shrimp farming system are applied exactly the same as with Experimental example 1 (Pond No. 1), however the system further comprises:

Network of Lights

Figure 8:
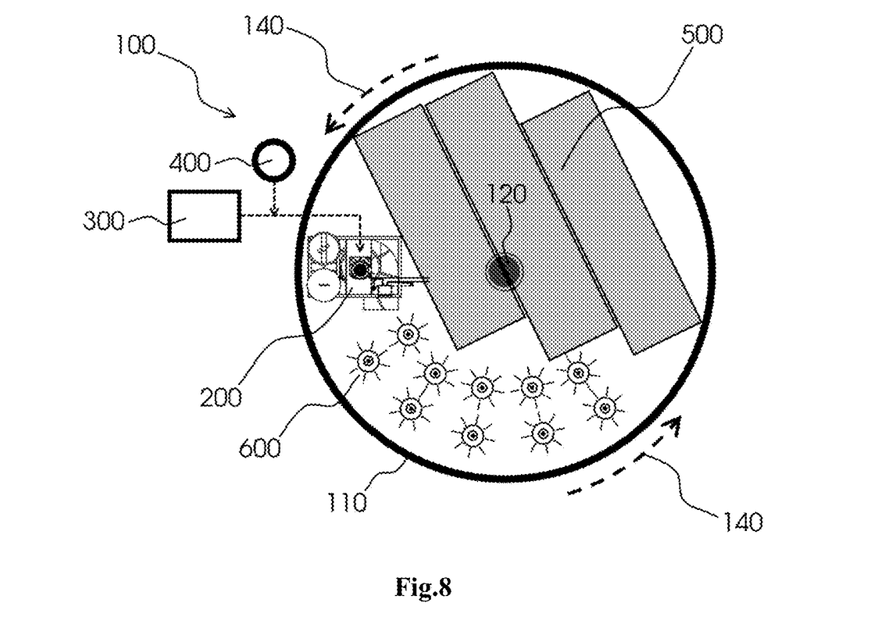
FIG. 8 shows the intensive shrimp farming system in experimental example 2 of the present invention.

Only the intensive shrimp farming system of "Pond No. 2" was equipped with network of lights consisting of 10 LEDs with a power of 400 W which includes 180 blue LEDs (1W) with a wavelength of 450 nm and 220 green LEDs (1W) with a wavelength of 510 nm. The light from this network of lights of this invention covers an area of 20 to 30%, and the lights are placed at the outlet of the water flow from the water flow generator (see FIG. 8).

At around 4:00 am (2 hours before sunrise), the LEDs with wavelength of 380 nm and 450 nm are automatically turned on with gradually increasing intensity. At 4:30 am, the LEDs with wavelength of 510 nm and 580 nm are turned on with gradually increasing intensity. At 5:30 am, the LEDs with wavelength of 450 nm gradually decrease intensity and are completely turned off at 6:00 am. At 6:30 am, the LEDs with wavelength of 380 nm, 510 nm, and 580 nm gradually decrease intensity and are completely turned off at 7:00 am.

At around 17:00, the LEDs with wavelength of 510 nm are automatically turned on with gradually increasing intensity. At 18:00, the LEDs with wavelength of 450 nm are turned on with gradually increasing intensity. At 19:00, the LEDs with wavelength of 510 nm gradually decrease intensity and are completely turned off at 19:30. At 19:30, the LEDs with wavelength of 450 nm gradually decrease intensity and are completely turned off at 20:00 AM. On and off time of lights can be adjusted longer or shorter in compare with the above procedure (see FIG. 9).

Comparative Example 1 (Pond No. 3)

In this comparative example, the mechanical oxygen generation system consists of an air blower (capacity of 2.2 kW) connected to 20 oxygen diffusers located at the bottom of the pond and 8-paddle wheels device floating on water (2.5 kW) to mix air containing about 20.5% oxygen into the water. The system operates continuously 24 hours a day. Dissolved oxygen concentration during the 70-day grow-out period were consistently below 7 mg/L (see FIG. 11B).

Figure 11B:
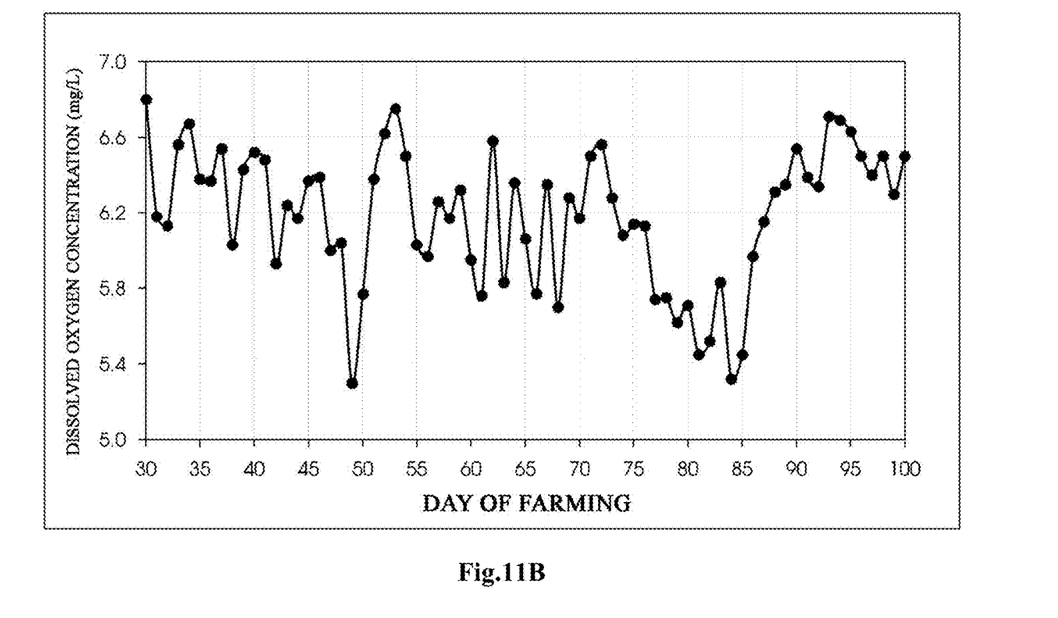
FIG. 11B shows a graph depicting changes in dissolved oxygen concentrations in an intensive shrimp pond using a traditional mechanical oxygen generation system consisting of an air blower connected to diffuser located on the bottom of the pond and paddle wheel device floating on the water.

In shrimp pond used mechanical oxygen generating system consisting of an air blower with a combination of diffusers on the bottom of the pond and paddle wheel device floating on water, the dissolved oxygen concentration cannot be higher than 7 mg/L during the process of commercial shrimp farming (see FIG. 11B). Therefore, increasing density of shrimp and high intensification are difficult to achieved with current system.

Result

Figure 13:
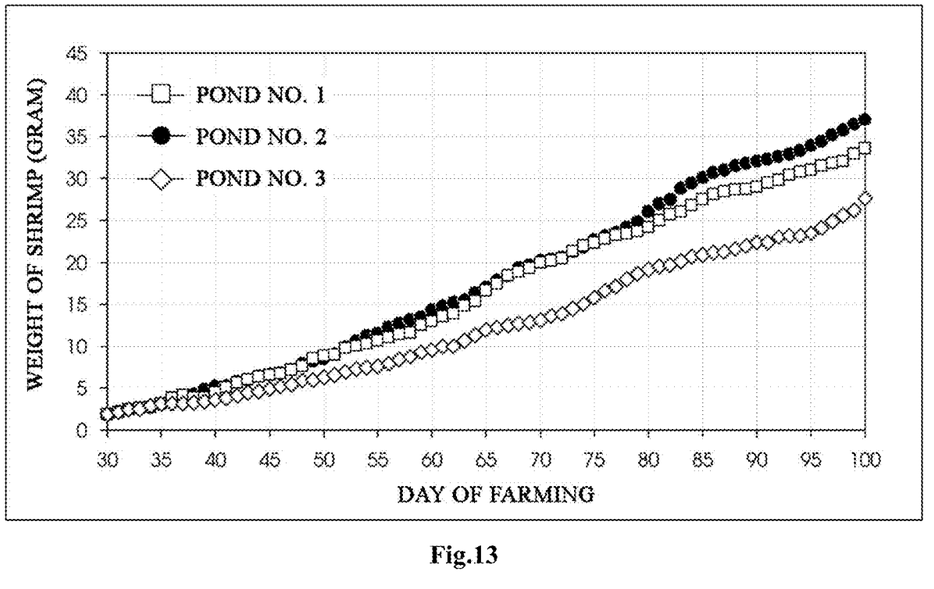
FIG. 13 shows a graph depicting the growth in average weight of shrimp by day of farming. Average weight values were measured per day with the RYNAN® Vis100A shrimp growth monitor applied artificial intelligence.
Figure 14A:
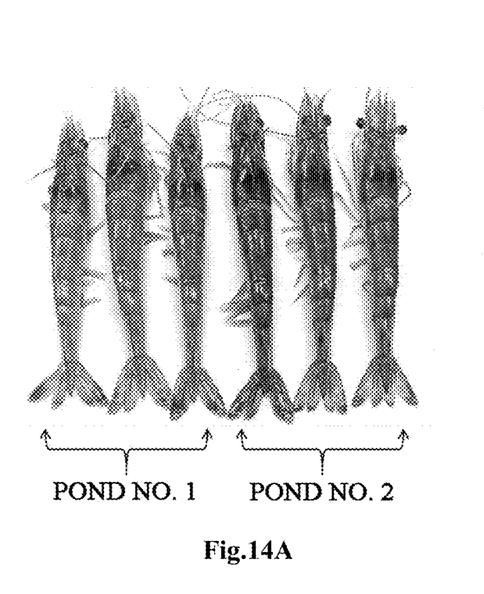
FIG. 14A, FIG. 14B and FIG. 14C shows images of shrimp harvested from Pond Nos. 1, 2 and 3 while alive and when heated with hot water.
Figure 14B:
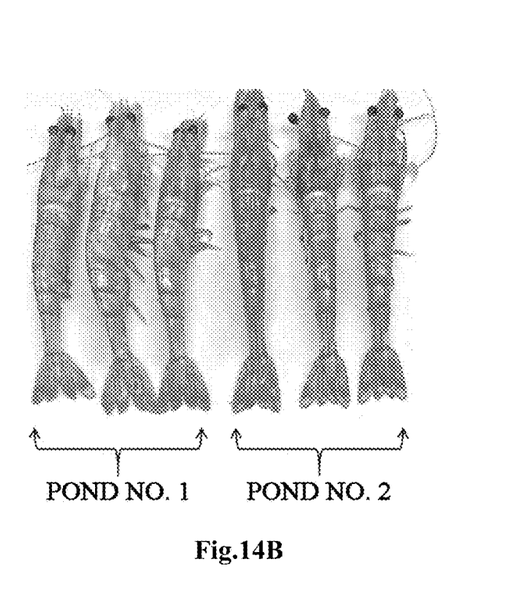
Figure 14C:
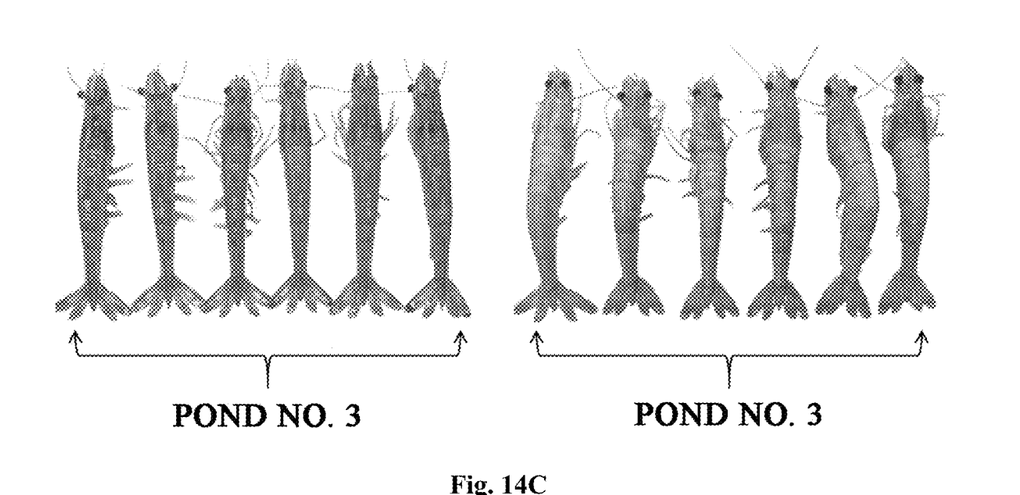

In Experimental example 1, 2 and Comparative example 1, three intensive commercial shrimp ponds were stocked with approximately 32,000 thirty-day-old breeders with an average weight of 1.82 g (CP Corporation) and harvested after 100 days. The results on the weight of shrimp during farming are shown in FIG. 13. Table 2 summarizes the harvest weight, mean shrimp weight, survival rate, feed conversion ratio and astaxanthin content of shrimp in Pond Nos. 1, 2 and 3. In addition, referring to the FIG. 14A, FIG. 14B and FIG. 14C, postharvest shrimp in the experimental examples showed better quality (with darker color due to rich in β-carotene and astaxanthin).

TABLE 2

Shrimp harvest results in Pond Nos. 1, 2 and 3.

| Description | Pond No. 1 | Pond No. 2 | Pond No. 3 |
|---|---|---|---|
| Harvest (tons) | 0.924 | 1.058 | 0.589 |
| Average weight of shrimp (g/head) | 33.6 | 37.05 | 27.46 |
| Survival rate (%) | 85.9 | 89.3 | 66.9 |
| Feed Conversion Ratio | 1.35 | 1.27 | 1.60 |
| Astaxanthin content of shrimp (μg/g) | 23.17 | 57.03 | 18.62 |
| Energy used to create oxygen (kWh/ton) | 2.754 | 2.405 | 8.043 |

Through the above results, it can be clearly seen that the intensive shrimp farming system according to the invention helps to increase the harvested shrimp output and reduce the energy used for the whole farming process when compared to the traditional intensive farming method using the mechanical oxygen generation system, thereby improving efficiency in shrimp farming, and reducing production costs.

The specific embodiments and examples described above are for illustrative purposes only, and the present disclosure is not limited thereto. The skilled persons may make different modifications or additions or use similar alternatives, but they still will not fall outside or beyond the scope of the invention, which are identified by the claims below.

The invention claimed is:

1. A multi-function device for intensive shrimp farming, comprising:
   a support frame to support other parts of the device;
   a water flow generator to create water flows in layers with a decreasing volumetric flow rate from a bottom to a surface of a shrimp pond, the water flow generator comprising an impeller, a motor driving the impeller through a drive shaft, and a body covering outside of said impeller, the body having a plate curved in a semicircle for catching water flows inside;
   a feeder unit for providing industrial and functional food for shrimp, the feeder unit comprising a first container, a lid above the first container, a food sensor inside said first container which can sense an amount of food inside, a feed output below said first container, and a feed dosing motor that is placed on top of said feed output;
   a substances-supplying unit for delivering substances into a shrimp pond environment, the substances-supplying unit comprising a second container, a crossbar on top of said second container, a stirring motor located in a middle of said crossbar, a pipe below said second container for leading a solution of substances to an outlet, and an automatic valve located on said pipe for controlling an amount of substance to be supplied;
   a gas dissolving unit for diffusing oxygen into water, the gas dissolving unit comprising of at least: a porous ceramic tube; a stainless steel pipe comprising holes, the stainless steel pipe being placed inside said porous ceramic tube; a gap between said stainless steel pipe and the porous ceramic tube, wherein the gap is filled with sand; and stainless steel bars arranged around said porous ceramic tube; wherein said porous ceramic tube is sandwiched with rubber fasteners between two round stainless steel plates, said round stainless steel plates being secured together by bolts passing through said two round stainless steel plates and said bolts being fastened at one end to one of said round stainless steel plates by rivets;
   a sensor for measuring water quality including dissolved oxygen concentration, pH, salinity, water temperature, turbidity, and measuring sunlight; and
   a controller to operate the multi-function device, to connect and communicate with other components including the water flow generator, the feeder unit, the substances-supplying unit, the gas dissolving unit and the sensor via wiring and/or wireless communication, wherein said controller is operable to receive, from the sensor, system data information, then determine and adjust appropriate parameters, and transmit order information to the other components so as to enable the other components to operate according to defined parameters.

2. The multi-function device of claim 1, wherein the porous ceramic tube has pores with a size less than 1.0 micrometer, the sand comprising particles have a diameter between 0.5 and 2.0 mm, and the stainless steel bars are arranged at an angle of 37 degrees around the porous ceramic tube.

3. The multi-function device of claim 1, wherein said device further comprises an indicator light connected to the controller and configured to communicate with the controller to generate alarm signals in different modes.

4. An intensive shrimp farming system, comprising:
   a shrimp pond with brackish water;
   at least one multifunction device according to claim 1 for generating water flow, dissolving molecular oxygen, delivering and dispensing shrimp feed and providing a solution containing minerals, and micro-organisms;
   a pure oxygen supply device to supply oxygen with purity higher than 90% to water in the shrimp pond; and
   a network of porous sheets floating on the water to reduce diffusion of oxygen molecules from the water to the air.

5. The intensive shrimp farming system of claim 4, wherein the porous sheets are made of polyethylene, polypropylene, or polyurethane materials.

6. The intensive shrimp farming system of claim 4, wherein the system further comprises a network of lights for providing artificial light to change a feeding cycle of shrimp with industrial and natural food.

7. The intensive shrimp farming system of claim 6, wherein the brackish water has a salinity between 5 and 30 g/L, a pH between 6.0 and 9.0 and an alkalinity greater than 80 mg/L.

8. The intensive shrimp farming system of claim 7, wherein the brackish water contains macro-minerals including cation-containing compounds of Ca, K, Mg, and/or P and trace minerals including cation-containing compounds of Co, Cu, Fe, I, Mn, Se, and/or Zn; and the alkalinity of the brackish water in the shrimp pond is between 80 and 250 mg/L.

9. The intensive shrimp farming system of claim 6, wherein the brackish water contains one or more algae selected from a group consisting of:

green algae: *Chlorella* sp., *Nannochloropsis* sp., *Scenedesmus* sp., Monoraphidium *contortum*, *Chlamydomonas* sp., Ankistrodesmus sp., *Haematococcus* sp., *Dunaliella* sp., Oocystis sp., *volvox* sp. và *ulothrix* sp.;

diatom algae: *Thalassiosira* sp., *Chaetoceros* sp., Eunotia sp., *Isochrysis* sp., Skeletonema sp., *Nitzschia* sp. và n*avicula* sp.; and

*spirulina* algae: *Spirulina* sp.

10. The intensive shrimp farming system of claim 6, wherein the brackish water also includes a group of microorganisms for environmental treatment, organic decomposition, and treatment of toxic gases and/or a group of microorganisms that support digestion, increase resistance, and resist harmful bacteria.

11. The intensive shrimp farming system of claim 6, wherein the network of lights comprising lights with wavelengths between 380 and 580 nm, incorporating LEDs emitting purple (wavelength of 380 nm), blue (wavelength of 450 nm), green (wavelength of 510 nm) and yellow (wavelength of 580 nm).

* * * * *